US012704163B2

(12) United States Patent
Odaira et al.

(10) Patent No.: US 12,704,163 B2
(45) Date of Patent: Aug. 11, 2026

(54) ELECTRIC BRAKE APPARATUS AND ELECTRIC DISK BRAKE

(71) Applicant: Hitachi Astemo, Ltd., Hitachinaka (JP)

(72) Inventors: Atsushi Odaira, Hitachinaka (JP); Haruhiko Fujita, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 419 days.

(21) Appl. No.: 18/278,952

(22) PCT Filed: Feb. 28, 2022

(86) PCT No.: PCT/JP2022/008190

§ 371 (c)(1),
(2) Date: Aug. 25, 2023

(87) PCT Pub. No.: WO2022/249609

PCT Pub. Date: Dec. 1, 2022

(65) Prior Publication Data

US 2024/0141964 A1 May 2, 2024

(30) Foreign Application Priority Data

May 28, 2021 (JP) ................................ 2021-090328

(51) Int. Cl.
*F16D 65/18* (2006.01)
*F16D 66/00* (2006.01)
*F16D 121/24* (2012.01)

(52) U.S. Cl.
CPC ........ *F16D 65/18* (2013.01); *F16D 2066/003* (2013.01); *F16D 2121/24* (2013.01)

(58) Field of Classification Search
CPC . F16D 65/18; F16D 2066/003; F16D 2121/24
(Continued)

(56) References Cited

U.S. PATENT DOCUMENTS 7,203,070 B2 * 4/2007 Weisz .................... H01R 25/00
361/728
9,302,656 B2 * 4/2016 Köth ...................... B60T 7/085
(Continued)

FOREIGN PATENT DOCUMENTS

JP 2000-168527 6/2000
JP 2008-105643 5/2008
(Continued)

OTHER PUBLICATIONS

International Search Report issued Apr. 5, 2022 in International Application No. PCT/JP2022/008190, with English-language translation.

(Continued)

*Primary Examiner* — Christopher P Schwartz
(74) *Attorney, Agent, or Firm* — Wenderoth, Lind & Ponack, L.L.P.

(57) ABSTRACT

An electric brake apparatus includes a control unit connected to an electric motor, a first connector portion connected to the control unit and configured for power feeding and input of one of redundant signals, a second connector portion connected to the control unit and configured for power feeding and input of another of the redundant signals, and a third connector connected to the control unit and configured for input of a signal related to a wheel speed.

10 Claims, 3 Drawing Sheets

(58) Field of Classification Search
USPC ...................... 188/156–164; 303/3, 7, 15, 20
See application file for complete search history.

(56) References Cited

U.S. PATENT DOCUMENTS

| | | | | |
|---|---|---|---|---|
| 11,702,058 | B2 * | 7/2023 | Bartels | B60T 13/662 303/20 |
| 12,280,760 | B2 * | 4/2025 | Tarandek | B60T 8/94 |
| 12,472,918 | B2 * | 11/2025 | Tarandek | B60T 8/17 |
| 2013/0282249 | A1 * | 10/2013 | Heise | B60T 13/746 701/70 |
| 2017/0072920 | A1 * | 3/2017 | Besier | B60T 8/4081 |
| 2017/0291635 | A1 | 10/2017 | Yamasaki | |
| 2020/0217379 | A1 * | 7/2020 | Odaira | F16D 65/183 |
| 2024/0389279 | A1 * | 11/2024 | Uchida | H02K 5/22 |

FOREIGN PATENT DOCUMENTS

| | | | | |
|---|---|---|---|---|
| JP | 5195360 | | 5/2013 | |
| JP | 2017-189033 | | 10/2017 | |
| JP | 2019-048594 | | 3/2019 | |
| WO | WO-2019054170 | A1 * | 3/2019 | F16K 31/0679 |

OTHER PUBLICATIONS

Written Opinion of the International Searching Authority issued Apr. 5, 2022 in International Application No. PCT/JP2022/008190, with English-language translation.

* cited by examiner

ELECTRIC BRAKE APPARATUS AND ELECTRIC DISK BRAKE

CROSS-REFERENCE TO RELATED APPLICATION

This application claims priority from Japanese Patent Application No. 2021-090328 filed on May 28, 2021. The entire disclosure including the description, the claims, the drawings, and the abstract in Japanese Patent Application No. 2021-090328 is herein incorporated by reference.

TECHNICAL FIELD

The present invention relates to an electric brake apparatus and an electric disk brake used for braking a vehicle.

BACKGROUND ART

As related art, Japanese Unexamined Patent Application Publication No. 2017-189033 discloses a technique related to a driving device that includes two first power supply and second power supply connectors and two first signal and second signal connectors.

SUMMARY OF INVENTION

Technical Problem

As described above, in the driving device according to Japanese Unexamined Patent Application Publication No. 2017-189033, redundancy is ensured by including two connectors having the same functionality. However, the driving device assumes application to an electric power steering apparatus. Accordingly, it does not take into consideration anti-noise measures for signals related to a wheel speed necessary for controlling the rotation of an electric motor in an electric brake apparatus that generates a braking force by pressing brake pads against a disk rotor with the electric motor.

Therefore, the present invention has one object to provide an electric brake apparatus and an electric disk brake that can provide redundancy for control and the like associated with power feeding and rotation of an electric motor while reducing noise in an input signal of a wheel speed.

Solution to Problem

As means to solve the problems described above, an electric brake apparatus includes a braking mechanism, an electric motor, a control unit, a first connector portion, a second connector portion, and a signal receiver. The braking mechanism is configured to press a braking member to a braked member. The electric motor is configured to drive the braking mechanism. The control unit is connected to the electric motor. The first connector portion is connected to the control unit and used for at least any one of power feeding and input of a predetermined signal. The second connector portion is connected to the control unit and including at least a part of a use of the first connector portion. The signal receiver is connected to the control unit and used for input of a signal related to a wheel speed.

An electric disk brake according to the present invention includes a mounting member, a caliper main body, an electric motor, a control substrate, a first connector, a second connector, and a third connector. The mounting member is fixed to a non-rotating portion of a vehicle and disposed over an outer peripheral side of a disk rotor. The caliper main body is disposed to the mounting member to be movable in an axial direction of the disk rotor and including a braking mechanism configured to press a friction pad to the disk rotor. The electric motor is configured to drive the braking mechanism. The control substrate includes a first control substrate section connected to the electric motor and having one of redundant control systems and a second control substrate section connected to the electric motor and having another of the redundant control systems. The first connector is connected to the first control substrate section and used for power feeding and input of one of redundant signals. The second connector is connected to the second control substrate section and used for power feeding and input of another of the redundant signals. The third connector is connectable to both the first control substrate section and the second control substrate section and used for input of a signal from a wheel speed detection sensor.

With the electric brake apparatus and the electric disk brake according to one embodiment of the present invention, redundancy for control and the like associated with power feeding and rotation of an electric motor can be provided, and noise in an input signal of a wheel speed can be reduced.

DESCRIPTION OF EMBODIMENTS

Figure 1:
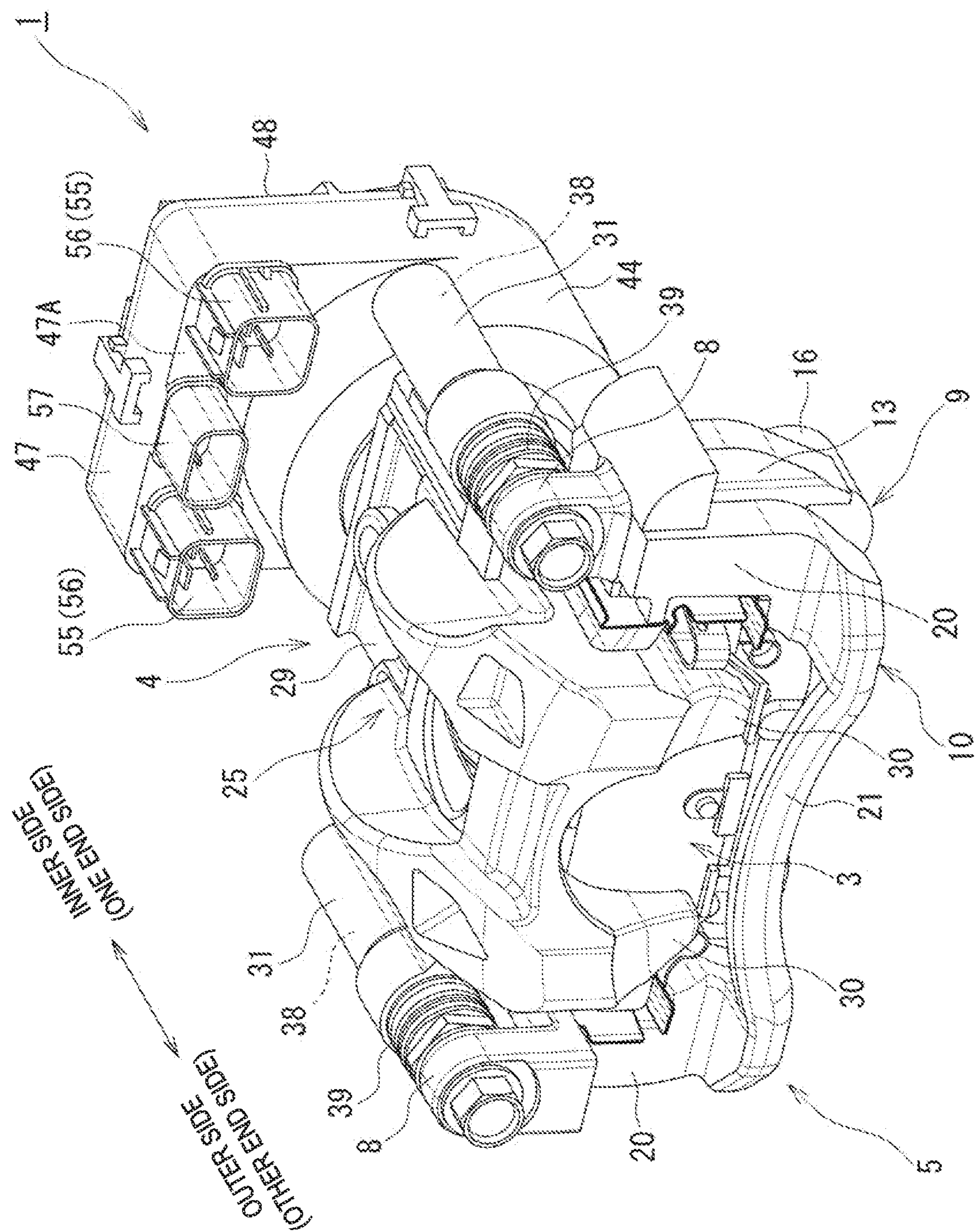
FIG. 1 is a perspective view of an electric disk brake according to an embodiment.
Figure 2:
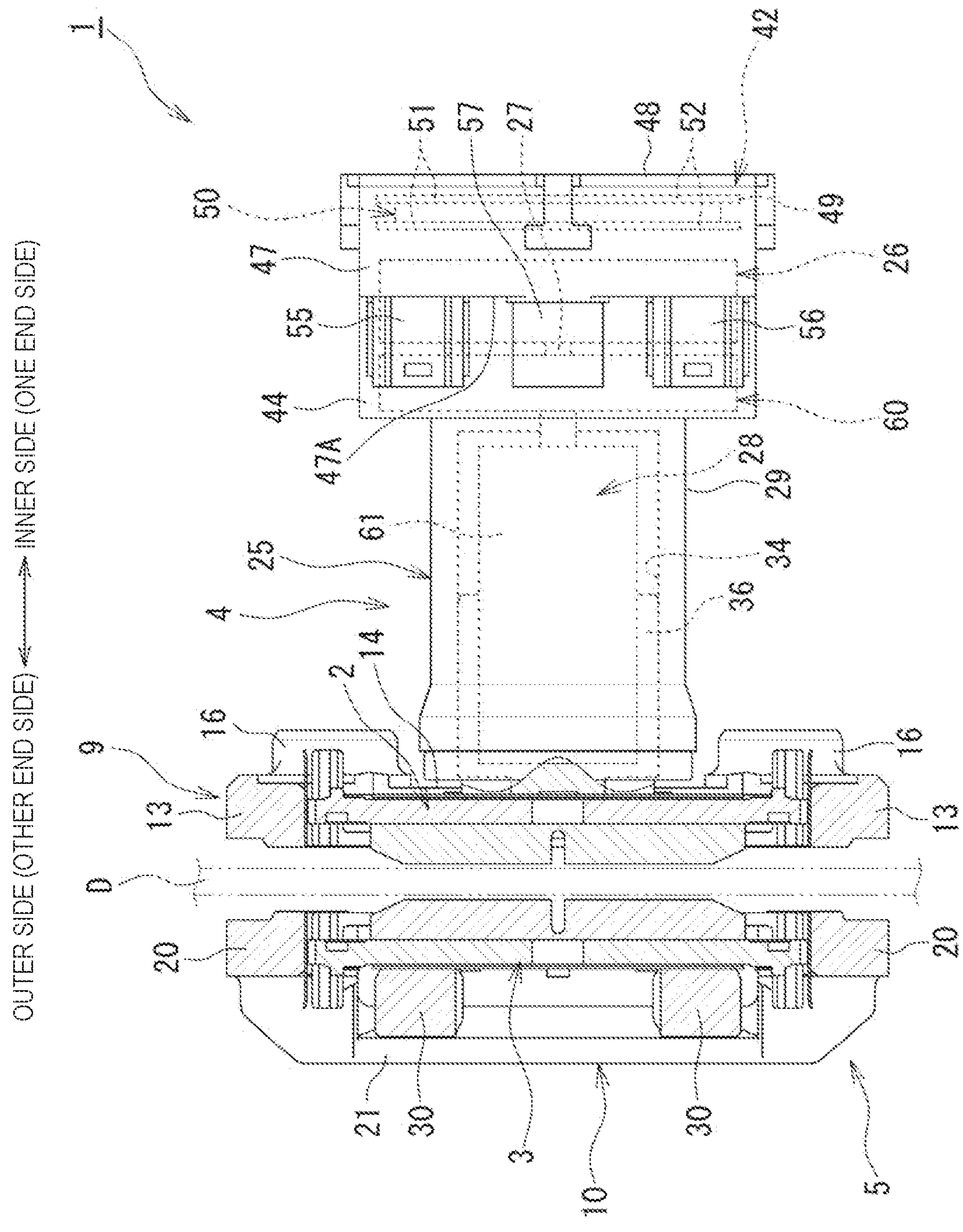
FIG. 2 is a partial cross-sectional view of the electric disk brake according to the embodiment.
Figure 3:
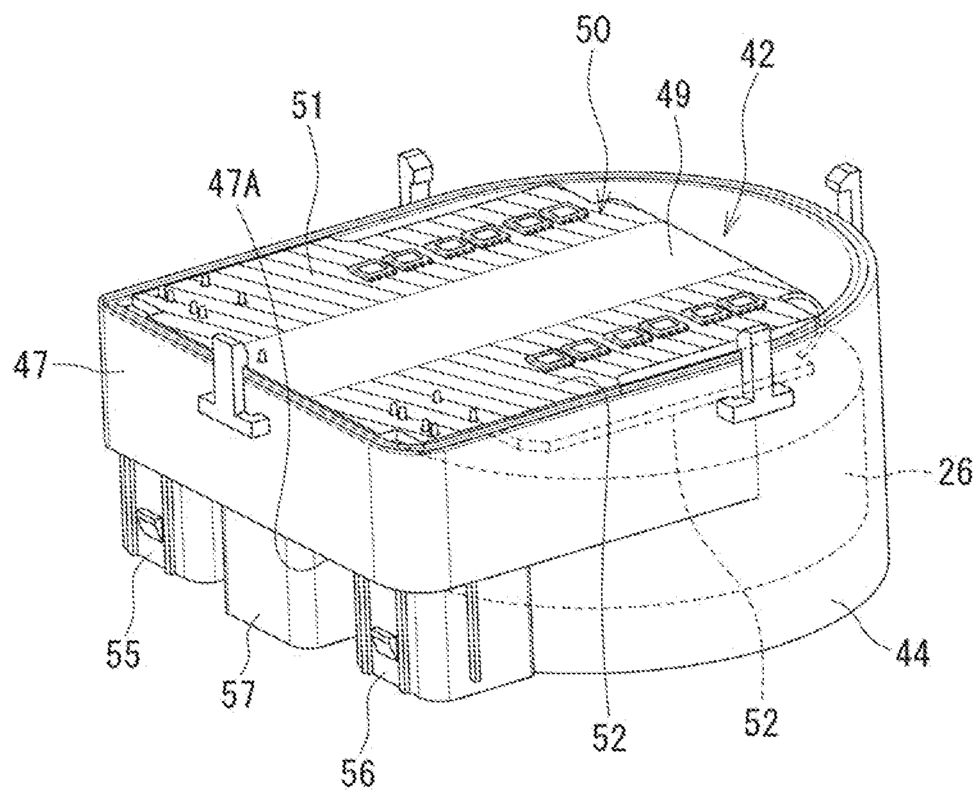
FIG. 3 is a perspective view illustrating a control unit inside a control unit housing employed for the electric disk brake according to the embodiment.

The following describes an embodiment in detail based on FIG. 1 to FIG. 3. As illustrated in FIG. 1 and FIG. 2, an electric disk brake 1 according to the embodiment is an electric brake apparatus that generates a braking force by driving of an electric motor 26 and is employed as a braking device during normal running of a vehicle. Note that in the following description, a vehicle internal side is referred to as an inner side, and a vehicle external side is referred to as an outer side. In some cases, the inner side is referred to as one end side, and the outer side is referred to as the other end side, as necessary. The electric disk brake 1 according to the embodiment includes a pair of inner brake pad 2 and outer brake pad 3 disposed on both sides in an axial direction across a disk rotor D installed in a rotating portion of the vehicle and a caliper 4. In FIG. 1, the disk rotor D is not illustrated.

The electric disk brake 1 according to the embodiment is configured as a caliper floating type. The pair of inner brake pad 2 and outer brake pad 3 and the caliper 4 are supported by a carrier 5 fixed to a non-rotating portion of the vehicle, such as a knuckle (not illustrated), to be movable in the axial direction of the disk rotor D relative to the carrier 5. A braking member corresponds to the pair of inner brake pad 2 and outer brake pad 3 that are friction pads. A braked member corresponds to the disk rotor D. Furthermore, a mounting member corresponds to the carrier 5.

As illustrated in FIG. 1 and FIG. 2, the carrier 5 includes a pair of pin coupling portions 8, 8 to which respective slide pins 38, 38 described later are coupled and inner side and outer side supporting portions 9, 10 that are integrally connected to the pair of pin coupling portions 8, 8 and independently support the inner and outer brake pads 2, 3, respectively. The pair of pin coupling portions 8, 8 are disposed at an interval along a rotation direction of the disk rotor D. Each pin coupling portion 8 is integrally connected to an inner side arm portion 13 of the inner side supporting portion 9 described later and an outer side arm portion 20 of the outer side supporting portion 10 described later and disposed to protrude to a side of each pin sliding portion 31 described later. Each pin coupling portion 8 is disposed to protrude from a position between the inner side arm portion 13 of the inner side supporting portion 9 and the outer side arm portion 20 of the outer side supporting portion 10.

The inner side supporting portion 9 includes a pair of inner side arm portions 13, 13 and an inner side beam portion 14. The pair of inner side arm portions 13, 13 are disposed at an interval along the rotation direction of the disk rotor D and extend in a direction perpendicular to an axial direction of the slide pin 38 described later. The inner side beam portion 14 couples end portions of the pair of inner side arm portions 13, 13 on an opposite side to the pin coupling portion 8. The inner brake pad 2 is supported inside the pair of inner side arm portions 13, 13 movably along the axial direction of the disk rotor D. The inner side beam portion 14 has both ends in the rotation direction of the disk rotor D to which a pair of fixing portions 16, 16 for fixing the carrier 5 to a non-rotating part of the vehicle are integrally connected.

The outer side supporting portion 10 includes a pair of outer side arm portions 20, 20 and an outer side beam portion 21. The pair of outer side arm portions 20, 20 are disposed on the outer side at an interval from the pair of inner side arm portions 13, 13 of the inner side supporting portion 9. The outer side beam portion 21 couples end portions of the pair of outer side arm portions 20, 20 on an opposite side to the pin coupling portion 8. The outer brake pad 3 is supported inside the pair of outer side arm portions 20, 20 movably along the axial direction of the disk rotor D. The carrier 5 is fixed to the non-rotating part of the vehicle via the pair of fixing portions 16, 16 of the inner side supporting portion 9.

The caliper 4 includes a caliper main body 25 as a main constituent of the caliper 4, the electric motor 26, and a braking mechanism 28. The braking mechanism 28 is included in the caliper main body 25, has a deceleration mechanism (or speed reducer) 60 and a rotation-linear motion conversion mechanism 61, and transmits a driving force from the electric motor 26 via the deceleration mechanism 60 and the rotation-linear motion conversion mechanism 61 to a piston 36 in a cylinder portion 29 of the caliper main body 25. The caliper main body 25 is integrally formed of the cylindrically-shaped cylinder portion 29, a pair of claw portions 30, 30, and a pair of pin sliding portions 31, 31. The cylinder portion 29 is disposed on a base end side opposed to the inner brake pad 2 and opens to be opposed to the inner brake pad 2. The pair of claw portions 30, 30 extend from the cylinder portion 29 across the disk rotor D to the outer side and are disposed on a tip end side opposed to the outer brake pad 3. The pair of pin sliding portions 31, 31 are disposed to protrude from spaced positions of the cylinder portion 29 along the rotation direction of the disk rotor D. In FIG. 2, in the cylinder portion 29, for ease of understanding, detailed plan view shapes extending from the pair of claw portions 30, 30 to the other end side, such as raised portions, are not illustrated.

In the cylinder portion 29, an approximately circular-shaped cylinder bore 34 opened from its other end surface is formed. The piston 36 is inserted into the cylinder bore 34 to be relatively nonrotatable with respect to the cylinder portion 29 and to be movable along the axial direction. For example, the piston 36 takes on a cup shape formed of a cylindrical portion and a bottom portion, and the axial direction thereof corresponds to the axial direction of the disk rotor D and the slide pin 38. In braking, a driving force from the electric motor 26 is transmitted via the braking mechanism 28 to the piston 36 in the cylinder portion 29. Then, the bottom portion of the piston 36 presses the inner brake pad 2 while the piston 36 moves forward toward the disk rotor D. On the other hand, in releasing the braking, a driving force from the electric motor 26 is transmitted via the braking mechanism 28 to the piston 36, and the piston 36 retracts from the disk rotor D.

The pair of pin sliding portions 31, 31 are each disposed integrally to the cylinder portion 29 of the caliper main body 25 to protrude toward the outside along the rotation direction of the disk rotor D. Each pin sliding portion 31 extends along the axial direction of the disk rotor D. Each pin sliding portion 31 is formed in a closed-bottomed cylindrical shape in which the other end surface is opened. The pair of slide pins 38, 38 are slidably inserted into the respective pair of pin sliding portions 31, 31 along the axial direction. The respective pin sliding portions 31, 31 are disposed on the one end side with respect to the pair of pin coupling portions 8, 8 of the carrier 5. The slide pin 38 extends along the axial direction of the disk rotor D. The slide pin 38 is formed in an elongated cross-sectional circular shape.

The pair of slide pins 38, 38 are inserted into the respective pin sliding portions 31, 31 disposed to the cylinder portion 29 from the other end side to be each slidable along the axial direction. The respective pair of slide pins 38, 38 are coupled to the corresponding respective pin coupling portions 8, 8 of the carrier 5. Pin boots 39, 39 having an extendable bellows portion are provided so as to cover the respective slide pins 38, 38. As a result, the pair of slide pins 38, 38 slide inside the respective pin sliding portions 31, 31 disposed to the cylinder portion 29, thereby allowing slidably supporting the caliper main body 25 (caliper 4) along the axial direction of the disk rotor D relative to the carrier 5.

To the electric motor 26, a control unit (ECU) 42 for controlling rotation of the electric motor 26 is electrically connected. The electric motor 26 is disposed on the one end side from the bottom portion of the cylinder portion 29. The electric motor 26 is housed in a cylindrically-shaped motor gear housing 44. The electric motor 26 is disposed on the one end side inside the motor gear housing 44. Specifically, the electric motor 26 is disposed across the motor gear housing 44 and a control unit housing 47 described later. The axial direction of a rotation shaft 27 of the electric motor 26 corresponds to the axial direction of the disk rotor D. The rotation shaft 27 of the electric motor 26 is approximately concentrically disposed with the cylinder bore 34 of the cylinder portion 29.

The control unit 42 controls the rotation (such as rotation direction and rotation speed) of the electric motor 26 based on various detection signals in braking during normal running. The detection signals include, for example, detection signals from detection sensors responding to requests from a driver and detection sensors that detect various situations required for braking, detection signals from a wheel speed detection sensor that detects a wheel speed, detection signals from a rotation angle detecting means (not illustrated) that detects a rotation angle of the rotation shaft 27 of the electric motor 26, and detection signals from a thrust sensor (not illustrated) or the like that detects a thrust force (pressing force) from the inner and outer brake pads 2, 3 to the disk rotor D. The control unit 42 is disposed on the one end side from the electric motor 26. In other words, the electric motor 26 is disposed between the control unit 42 (a first control substrate section 51 and a second control substrate section 52 described later) and the inner and outer brake pads 2, 3 along the axial direction of the rotation shaft 27.

The control unit 42 is housed on the one end side in the control unit housing 47. The control unit housing 47 is integrally connected to the motor gear housing 44. The control unit housing 47 is configured to be disposed to protrude from the motor gear housing 44 toward an opposite side to the inner side and outer side beam portions 14, 21 side of the inner side and outer side supporting portions 9, 10. Accordingly, in the control unit housing 47, another end surface 47A of the control unit housing 47 is exposed from the motor gear housing 44 to the opposite side to the inner side and outer side beam portions 14, 21 side of the inner side and outer side supporting portions 9, 10. The control unit housing 47 has an opening on the one end side that is closed with a cover member 48. In FIG. 3, the cover member 48 is not illustrated.

With reference to FIG. 3, the control unit 42 is configured by a control substrate section 50 having at least one or more control substrates 49. In the embodiment, the control unit 42 is configured by the control substrate section 50 in which one long control substrate 49 is folded into two tiers. While in the embodiment, the control unit 42 is configured by the control substrate section 50 in which one long control substrate 49 is folded into two tiers, the control unit 42 may be configured by an aspect equivalent to a module instead of the control substrate 49.

The control substrate section 50 (control unit 42) includes the first control substrate section 51 (a range with diagonal lines in FIG. 3) and the second control substrate section 52 (a range with diagonal lines in FIG. 3). The first control substrate section 51 is formed to be two-tiered by folding one control substrate 49 and has one of redundant control systems disposed on one end side in an extending direction of the inner side and outer side beam portions 14, 21 of the inner side and outer side supporting portions 9, 10. The second control substrate section 52 is two-tiered and has the other of the redundant control systems disposed on the other end side in the extending direction of the inner side and outer side beam portions 14, 21 of the inner side and outer side supporting portions 9, 10. Basically, the first control substrate section 51 and the second control substrate section 52 are each disposed so as to be arranged on the same planar surface (the same planar surface of a first tier and the same planar surface of a second tier) as the control substrate section 50.

Note that, as another embodiment, two control substrates 49, 49 may be each disposed so as to be arranged on the same planar surface, with the first control substrate section 51 disposed on one control substrate 49 and the second control substrate section 52 disposed on the other control substrate 49 to configure the control substrate section 50. Furthermore, as another embodiment, the first control substrate section 51 may be disposed on any one tier (first tier or second tier) of the two tiers into which one long control substrate 49 is folded, and the second control substrate section 52 may be disposed on the other tier (first tier or second tier) of the two tiers.

A first connector 55, a second connector 56, and a third connector 57 are each connected to the control unit 42. The first connector 55 is used for power feeding and input of one of redundant signals. The second connector 56 is used for power feeding and input of the other of the redundant signals. The third connector 57 is used for input of signals from a wheel speed detection sensor (not illustrated). The first connector 55 is used for input of, for example, various detection signals described above, such as detection signals from detection sensors responding to requests from a driver and detection sensors that detect various situations required for braking, and can also be used for input of other signals besides the input of the one of the redundant signals. Similarly to the first connector 55, the second connector 56 is used for input of various detection signals described above, and can also be used for input of other signals besides the input of the other of the redundant signals.

In the embodiment, both the first connector 55 and the second connector 56 are used for the input of the same signals, in addition to the power feeding. Basically, the first connector 55 and the second connector 56 have the same functionality. In the embodiment, both the first connector 55 and the second connector 56 are used for the input of the same signals, in addition to the power feeding. However, both the first and second connectors 55, 56 may be used only for the power feeding or may be used only for the input of the redundant signals. Further, the third connector 57 can also be used for input of signals from other various detection sensors besides the input of signals from the wheel speed detection sensor. In the embodiment, the third connector 57 connected to the control unit 42 is provided. However, instead of the third connector 57, a signal receiver to which the signals from the wheel speed detection sensor are input via an integrated controller of the vehicle may be provided, and the signal receiver may be electrically connected to the control unit 42.

As illustrated in FIG. 1 to FIG. 3, the first connector 55, the second connector 56, and the third connector 57 are disposed to protrude from the other end surface 47A of the control unit housing 47, which is a part disposed to protrude from the motor gear housing 44, toward the other end side. In other words, the first connector 55, the second connector 56, and the third connector 57 are disposed to protrude from the other end surface 47A of the control unit housing 47 along the axial direction of the rotation shaft 27 of the electric motor 26 toward the inner and outer brake pads 2, 3. The first connector 55, the second connector 56, and the third connector 57 are disposed so as to be arranged in a row. Specifically, the first connector 55, the second connector 56, and the third connector 57 are disposed so as to be arranged in a row along the same direction as the extending direction of the inner side and outer side beam portions 14, 21 of the inner side and outer side supporting portions 9, 10. The third connector 57 is disposed between the first connector 55 and the second connector 56.

In the embodiment, the first connector 55, the second connector 56, and the third connector 57 are each configured as one independent connector. However, the first connector 55, the second connector 56, and the third connector 57 may be configured as a first connector portion, a second connector portion, and a third connector portion, respectively, and these first to third connector portions may be combined to configure one connector. Further, the first connector portion and the second connector portion may be combined to configure one connector, the first connector portion and the third connector portion may be combined to configure one connector, or the second connector portion and the third connector portion may be combined to configure one connector.

In the embodiment, the first connector 55 is disposed on the first control substrate section 51 side of the control substrate section 50 (control unit 42) and connected to one another. The second connector 56 is disposed on the second control substrate section 52 side of the control substrate section 50 (control unit 42) and connected to one another. Basically, the first connector 55 may be disposed on any one side of the first or second control substrate section 51, 52 of the control substrate section 50 (control unit 42) and connected to one another. The second connector 56 may be disposed on the other side of the first or second control substrate section 51, 52 of the control substrate section 50 (control unit 42) and connected to one another. The third connector 57 is configured to be connectable to both the first control substrate section 51 and the second control substrate section 52 of the control substrate section 50 (control unit 42) and to allow switching between a connection state of the first control substrate section 51 to the third connector 57 and a connection state of the second control substrate section 52 to the third connector 57 by switching (not illustrated) and the like in terms of control.

In the embodiment, the first connector 55 is connected to the first control substrate section 51, and the second connector 56 is connected to the second control substrate section 52. However, the first connector 55 may be connected to both the first control substrate section 51 and the second control substrate section 52, and the second connector 56 may be connected to both the first control substrate section 51 and the second control substrate section 52. Additionally, the first connector 55 may be connected to both the first control substrate section 51 and the second control substrate section 52, and the second connector 56 may be connected to the second control substrate section 52.

As illustrated in FIG. 2, the braking mechanism 28 is included in the caliper main body 25 and includes the deceleration mechanism (or speed reducer) 60 that increases rotating torque from the electric motor 26 and the rotation-linear motion conversion mechanism 61 that converts rotational motion from the deceleration mechanism 60 into linear motion to provide a thrust force to the piston 36. Rotation from the rotation shaft 27 of the electric motor 26 is transmitted to the deceleration mechanism 60. The deceleration mechanism 60 increases the rotating torque from the electric motor 26 and transmits it to the rotation-linear motion conversion mechanism 61. As the deceleration mechanism 60, a planetary gear reduction mechanism or the like is employed. The deceleration mechanism 60 is housed on the other end side (cylinder portion 29 side) in the motor gear housing 44. The rotation-linear motion conversion mechanism 61 is disposed between the bottom portion of the cylinder portion 29 and the piston 36 in the cylinder bore 34 of the cylinder portion 29. The rotation-linear motion conversion mechanism 61 converts the rotational motion from the deceleration mechanism 60 into linear motion to provide a thrust force to the piston 36. As the rotation-linear motion conversion mechanism 61, a ball screw mechanism, a ball and ramp mechanism, or the like is employed.

Then, in the electric disk brake 1 according to the embodiment, in braking during normal running, signals including redundant signals, such as detection signals from the detection sensors responding to requests from a driver and detection sensors that detect various situations required for braking, are input via the first or second connector 55, 56 to the first or second control substrate section 51, 52 of the control unit 42 (control substrate section 50). Note that the signals including redundant signals may be input via the first and second connectors 55, 56 to the first and second control substrate sections 51, 52 of the control unit 42 (control substrate section 50). Signals, such as detection signals from the wheel speed detection sensor that detects a wheel speed, are input via the third connector 57 to the first or second control substrate section 51, 52 of the control unit 42. Furthermore, signals, such as detection signals from the rotation angle detecting means that detects a rotation angle of the rotation shaft 27 of the electric motor 26 and detection signals from the thrust sensor that detects a thrust force from the inner and outer brake pads 2, 3 to the disk rotor D, are input to the first or second control substrate section 51, 52 of the control unit 42. Moreover, power is fed from a power source (not illustrated) via the first or second connector 55, 56 to the control unit 42.

Subsequently, in the first or second control substrate section 51, 52 of the control unit 42, based on these detection signals, the rotation in a positive direction of the rotation shaft 27 of the electric motor 26, that is, the rotation in a braking direction is controlled. The rotation of the electric motor 26 is transmitted to the deceleration mechanism 60 of the braking mechanism 28. Subsequently, the rotation increased by the deceleration mechanism 60 is transmitted to the rotation-linear motion conversion mechanism 61 of the braking mechanism 28. The rotational motion from the deceleration mechanism 60 is converted into linear motion by the rotation-linear motion conversion mechanism 61, thereby moving the piston 36 forward, and the forward movement of the piston 36 causes the inner brake pad 2 to press the disk rotor D.

Then, by a reactive force against the pressing force to the inner brake pad 2 by the piston 36, the sliding movement of the pair of slide pins 38, 38 in the axial direction inside the pair of pin sliding portions 31, 31 causes the caliper main body 25 (caliper 4) to move to the inner side with respect to the carrier 5, and the outer brake pad 3 in contact with the pair of claw portions 30, 30 presses the disk rotor D. As a result, the disk rotor D is sandwiched tightly by the pair of inner and outer brake pads 2, 3, generating a friction force, and eventually a braking force of the vehicle is generated.

On the other hand, in releasing the braking, the rotation of the rotation shaft 27 of the electric motor 26 is controlled to a reverse direction, that is, a release direction by a command from the first or second control substrate section 51, 52 of the control unit 42 (control substrate section 50), and the rotation in the reverse direction is transmitted via the deceleration mechanism 60 of the braking mechanism 28 to the rotation-linear motion conversion mechanism 61. As a result, the piston 36 retracts and returns to an initial state, and the braking force to the disk rotor D by the pair of inner and outer brake pads 2, 3 is released.

In such braking during normal running and in releasing the braking, even in a situation where both the first control substrate section 51 and the second control substrate section 52 of the control substrate section 50 are normal and a failure occurs in any one of the first connector 55 or the second connector 56, the other normal one of the first connector 55 or the second connector 56 enables control associated with power feeding and the rotation of the electric motor 26 in the control unit 42. Additionally, in the control substrate section 50, even in a situation where both the first connector 55 and the second connector 56 are normal and a failure occurs in any one of the first control substrate section 51 or the second control substrate section 52, the other normal one of the first control substrate section 51 or the second control substrate section 52 enables the control associated with the rotation of the electric motor 26. Furthermore, since signals from the wheel speed detection sensor are directly input via the third connector 57 to the control substrate section 50, noise in the signals input from the wheel speed detection sensor to the control substrate section 50 can be reduced.

The electric disk brake 1 according to the embodiment described above includes, in particular, the first connector 55, the second connector 56, and the third connector 57. The first connector 55 is connected to the control unit 42 and used for power feeding and input of one of redundant signals. The second connector 56 is connected to the control unit 42 and used for power feeding and input of the other of the redundant signals. The third connector 57 is connected to the control unit 42 and used for input of signals from the wheel speed detection sensor.

Accordingly, in the electric disk brake 1 according to the embodiment, in braking during normal running and in releasing the braking, even in a situation where the control unit 42 is normal and a failure occurs in any one of the first connector 55 or the second connector 56, the other normal one of the first connector 55 or the second connector 56 enables the control associated with power feeding and the rotation of the electric motor 26 in the control unit 42, ensuring a normal braking action, in other words, allowing providing redundancy. Further, since signals from the wheel speed detection sensor are directly input via the third connector 57 to the control unit 42, noise in the signals input from the wheel speed detection sensor to the control unit 42 can be reduced, and accuracy of the control associated with the braking action by the control unit 42 can be improved.

In the electric disk brake 1 according to the embodiment, the control substrate section 50 as the control unit 42 includes the first control substrate section 51 having one of redundant control systems and the second control substrate section 52 having the other of the redundant control systems. The first connector 55 is connected to the first control substrate section 51, and the second connector 56 is connected to the second control substrate section 52. Accordingly, even in a situation where both the first connector 55 and the second connector 56 are normal and a failure occurs in any one of the first control substrate section 51 or the second control substrate section 52 in the control substrate section 50, the other normal one of the first control substrate section 51 or the second control substrate section 52 enables the control associated with the rotation of the electric motor 26, ensuring a normal braking action.

Furthermore, in the electric disk brake 1 according to the embodiment, an embodiment, in which the first connector 55 is connected to both the first control substrate section 51 and the second control substrate section 52 while the second connector 56 is connected to both the first control substrate section 51 and the second control substrate section 52, may be employed. With this embodiment, even in a situation where a failure occurs in any one of the first connector 55 or the second connector 56 and a failure occurs in any one of the first control substrate section 51 or the second control substrate section 52, the other normal one of the first connector 55 or the second connector 56 and the other normal one of the first control substrate section 51 or the second control substrate section 52 enable the control associated with power feeding and the rotation of the electric motor 26, ensuring a normal braking action. The redundancy can be improved more than that of the electric disk brake 1 according to the embodiment described above.

Moreover, in the electric disk brake 1 according to the embodiment, the third connector 57 is configured to be connectable to both the first control substrate section 51 and the second control substrate section 52 and to allow switching between the connection state of the first control substrate section 51 to the third connector 57 and the connection state of the second control substrate section 52 to the third connector 57 in terms of control. As a result, even in a situation where a failure occurs in any one of the first control substrate section 51 or the second control substrate section 52 of the control substrate section 50 in braking during normal running and in releasing the braking, the signals of the wheel speed detection sensor from the third connector 57 can be input to the other normal one of the first control substrate section 51 or the second control substrate section 52. This allows inputting the signals of the wheel speed detection sensor from the third connector 57 normally to the control substrate section 50 and normally controlling the rotation of the electric motor 26 by the control substrate section 50.

Moreover, in the electric disk brake 1 according to the embodiment, the control substrate section 50 is configured such that the first control substrate section 51 and the second control substrate section 52 are disposed so as to be arranged on the same planar surface. The first connector 55 is disposed on the first control substrate section 51 side and connected to one another. The second connector 56 is disposed on the second control substrate section 52 side and connected to one another. Further, the third connector 57 is disposed between the first connector 55 and the second connector 56. With the embodiment, space efficiency can be improved, and the electric disk brake 1 growing in size can be suppressed.

Moreover, in the electric disk brake 1 according to the embodiment, an embodiment, in which the first connector 55 is connected to both the first control substrate section 51 and the second control substrate section 52 while the second connector 56 is connected to the second control substrate section 52, may be employed. With this embodiment, even in a situation where a failure occurs in the second connector 56 and any one of the first control substrate section 51 or the second control substrate section 52, the normal first connector 55 and the other normal one of the first or second control substrate section 51, 52 enable the control associated with power feeding and the rotation of the electric motor 26, ensuring a normal braking action. The redundancy can be improved more than that of the electric disk brake 1 according to the embodiment described above.

Moreover, in the electric disk brake 1 according to the embodiment, in the axial direction of the rotation shaft 27 of the electric motor 26, the inner and outer brake pads 2, 3 are disposed across the electric motor 26 from the first control substrate section 51 and the second control substrate section 52. The first connector 55, the second connector 56, and the third connector 57 are disposed so as to extend to the inner and outer brake pads 2, 3 side in the axial direction of the rotation shaft 27 of the electric motor 26, in other words, to extend toward the inner and outer brake pads 2, 3. This can suppress the electric disk brake 1 growing in size along the axial direction of the disk rotor D (axial direction of the rotation shaft 27 of the electric motor 26).

The present invention is not limited to the embodiments described above and includes various modifications. For example, the above-described embodiments are described in detail in order to facilitate the description of the present invention and not necessarily limited to one that includes all the described configurations. A part of the configuration in one embodiment can be replaced with a configuration in another embodiment, and the configuration in another embodiment can be added to the configuration in one embodiment. Further, addition, omission, and replacement of another configuration can be performed on a part of the configuration in each embodiment.

This application claims priority from Japanese Patent Application No. 2021-090328 filed on May 28, 2021. The entire disclosure including the description, the claims, the drawings, and the abstract in Japanese Patent Application No. 2021-090328 filed on May 28, 2021 is herein incorporated by reference.

REFERENCE SIGNS LIST

1 . . . electric disk brake
2 . . . inner brake pad (braking member, friction pad)
3 . . . outer brake pad (braking member, friction pad)
4 . . . caliper
5 . . . carrier (mounting member)
25 . . . caliper main body
26 . . . electric motor
28 . . . braking mechanism
42 . . . control unit
49 . . . control substrate
50 . . . control substrate section
51 . . . first control substrate section
52 . . . second control substrate section
55 . . . first connector (first connector portion)
56 . . . second connector (second connector portion)
57 . . . third connector (signal receiver, third connector portion)
D . . . disk rotor (braked member)

The invention claimed is:

1. An electric brake apparatus comprising:
a braking mechanism configured to press a braking member to a braked member;
an electric motor configured to drive the braking mechanism;
a control unit connected to the electric motor;
a first connector portion connected to the control unit and configured for at least any one of power feeding or input of a predetermined signal;
a second connector portion connected to the control unit and configured to include at least a part of a use of the first connector portion; and
a third connector portion connected to the control unit and configured for input of a signal related to a wheel speed,
wherein:
the control unit is a control substrate section having at least one control substrate;
the control substrate section includes a first control substrate section having one of redundant control systems and a second control substrate section having another of the redundant control systems;
the first connector portion is connected to the first control substrate section;
the second connector portion is connected to the second control substrate section; and
the third connector portion is configured to: (i) be connectable to both the first control substrate section and the second control substrate section; and (ii) allow controllable switching between a connection state of the first control substrate section to the third connector portion and a connection state of the second control substrate section to the third connector portion.

2. The electric brake apparatus according to claim 1, wherein:
the braking member is disposed across the electric motor from the control substrate section in a rotation axis line direction of the electric motor; and
the first connector portion, the second connector portion, and the third connector portion extend to a braking member side in the rotation axis line direction of the electric motor.

3. The electric brake apparatus according to claim 1, wherein:
the first control substrate section and the second control substrate section are disposed on a same planar surface; and
the first connector portion and the second connector portion are disposed across the third connector portion, the first connector portion is connected to the first control substrate section, and the second connector portion is connected to the second control substrate section.

4. An electric brake apparatus comprising:
a braking mechanism configured to press a braking member to a braked member;
an electric motor configured to drive the braking mechanism;
a control unit connected to the electric motor;
a first connector portion connected to the control unit and configured for at least any one of power feeding or input of a predetermined signal;
a second connector portion connected to the control unit and configured to include at least a part of a use of the first connector portion; and
a third connector portion connected to the control unit and configured for input of a signal related to a wheel speed,
wherein:
the control unit is a control substrate section having at least one control substrate;
the braking member is disposed across the electric motor from the control substrate section in a rotation axis line direction of the electric motor; and
the first connector portion, the second connector portion, and the third connector portion extend to a braking member side in the rotation axis line direction of the electric motor.

5. The electric brake apparatus according to claim 4, wherein:
the control substrate section includes a first control substrate section having one of redundant control systems and a second control substrate section having another of the redundant control systems;
the first connector portion is connected to the first control substrate section; and
the second connector portion is connected to the second control substrate section.

6. The electric brake apparatus according to claim 5, wherein the third connector portion is configured to: (i) be connectable to both the first control substrate section and the second control substrate section; and (ii) allow controllable switching between a connection state of the first control substrate section to the third connector portion and a connection state of the second control substrate section to the third connector portion.

7. The electric brake apparatus according to claim 6, wherein:
the first control substrate section and the second control substrate section are disposed on a same planar surface; and the first connector portion and the second connector portion are disposed across the third connector portion, the first connector portion is connected to the first control substrate section, and the second connector portion is connected to the second control substrate section.

8. The electric brake apparatus according to claim 4, wherein:

the control substrate section includes a first control substrate section having one of redundant control systems and a second control substrate section having another of the redundant control systems;

the first connector portion is connected to both the first control substrate section and the second control substrate section; and the second connector portion is connected to the second control substrate section.

9. The electric brake apparatus according to claim 4, wherein:

the control substrate section includes a first control substrate section having one of redundant control systems and a second control substrate section having another of the redundant control systems;

the first connector portion is connected to both the first control substrate section and the second control substrate section; and the second connector portion is connected to both the first control substrate section and the second control substrate section.

10. An electric disk brake comprising:

a mounting member configured to be fixed to a non-rotating portion of a vehicle and disposed over an outer peripheral side of a disk rotor;

a caliper main body disposed to the mounting member to be movable in an axial direction of the disk rotor and including a braking mechanism configured to press a friction pad to the disk rotor;

an electric motor configured to drive the braking mechanism;

a control substrate including a first control substrate section connected to the electric motor and having one of redundant control systems and a second control substrate section connected to the electric motor and having another of the redundant control systems;

a first connector connected to the first control substrate section and configured for power feeding and input of one of redundant signals;

a second connector connected to the second control substrate section and configured for power feeding and input of another of the redundant signals; and a third connector connectable to both the first control substrate section and the second control substrate section and configured for input of a signal from a wheel speed detection sensor, wherein:

the braking member is disposed across the electric motor from the control substrate section in a rotation axis line direction of the electric motor; and the first connector portion, the second connector portion, and the third connector portion extend to a braking member side in the rotation axis line direction of the electric motor.

* * * * *